(12) United States Patent
DeCaprio

(10) Patent No.: US 7,676,828 B1
(45) Date of Patent: *Mar. 9, 2010

(54) METHOD AND SYSTEM FOR AUTHENTICATING AND AUTHORIZING REQUESTORS INTERACTING WITH CONTENT SERVERS

(75) Inventor: Donald Joseph DeCaprio, Issaquah, WA (US)

(73) Assignee: F5 Networks, Inc., Seattle, WA (US)

( * ) Notice: Subject to any disclaimer, the term of this patent is extended or adjusted under 35 U.S.C. 154(b) by 318 days.

This patent is subject to a terminal disclaimer.

(21) Appl. No.: 11/531,662

(22) Filed: Sep. 13, 2006

Related U.S. Application Data

(63) Continuation of application No. 10/198,434, filed on Jul. 16, 2002, now Pat. No. 7,114,180.

(51) Int. Cl.
*H04L 29/06* (2006.01)
(52) U.S. Cl. .............................. 726/4; 726/12
(58) Field of Classification Search ................. None
See application file for complete search history.

(56) References Cited

U.S. PATENT DOCUMENTS

| | | | |
|---|---|---|---|
| 6,233,618 B1 | 5/2001 | Shannon | |
| 6,405,219 B2 * | 6/2002 | Saether et al. | 707/201 |
| 6,970,918 B2 * | 11/2005 | Brown et al. | 709/219 |
| 6,990,684 B2 | 1/2006 | Futamura et al. | |
| 6,996,841 B2 * | 2/2006 | Kadyk et al. | 726/12 |
| 7,487,539 B2 * | 2/2009 | Ramachandran et al. | 726/10 |
| 2002/0147929 A1 * | 10/2002 | Rose | 713/201 |
| 2003/0196114 A1 * | 10/2003 | Brew et al. | 713/201 |
| 2004/0165588 A1 * | 8/2004 | Pandya | 370/389 |

* cited by examiner

*Primary Examiner*—Gilberto Barron, Jr.
*Assistant Examiner*—Minh Dinh
(74) *Attorney, Agent, or Firm*—Darby & Darby PC; John W. Branch

(57) ABSTRACT

A method and system for authenticating and authorizing requesters interacting with content servers. A message including a request is forwarded from an upstream device and received by an intermediate device. The intermediate device authenticates the upstream device. Then, if the intermediate device is authorized to make decisions as to which sender may access the content server, the intermediate device determines whether the sender of the message has authority to access the content server as requested in the request. Otherwise, the message is forwarded towards the content server with an indication that the intermediate device authenticated the upstream device.

24 Claims, 7 Drawing Sheets

METHOD AND SYSTEM FOR AUTHENTICATING AND AUTHORIZING REQUESTORS INTERACTING WITH CONTENT SERVERS

CROSS-REFERENCE TO RELATED APPLICATIONS

This utility patent application is a continuation of allowed U.S. patent application Ser. No. 10/198,434 filed on Jul. 16, 2002, the benefit of which is claimed under 35 U.S.C. §120, and is further incorporated herein by reference.

FIELD OF THE INVENTION

This application relates generally to controlling and updating geographically distributed servers on a network, and, more specifically, to providing security in accessing content servers.

BACKGROUND

Often, source files for Web content servers are coded by multiple programmers on remotely located (stage) source servers. It is not unusual for one or more programmers to code "HTML" files on one source server while one or more other programmers create executable and/or image files on another source server. To provide new or updated content, typically modified or created files are distributed to content servers. Historically, the distribution of a set of "updated" or new files from remotely located source servers through the Internet to content servers has proven to be a difficult task.

This task has been further complicated by the sharing of content servers by multiple customers. In the past, a content publisher enjoyed exclusive use of source servers and content servers. Competing use of resources, if any, came from competing interests of the content publisher, not another customer. Now, content servers may be shared among many different content publishers. This sharing of content servers has introduced new problems related to securely accessing and controlling resources on content servers.

SUMMARY

In accordance with the present invention, there is provided a method and system for authenticating and authorizing requesters interacting with content servers. A message including a request is forwarded from an upstream device and received by an intermediate device. The intermediate device authenticates the upstream device. Then, if the intermediate device is authorized to make decisions as to which sender may access the content server, the intermediate device determines whether the sender of the message has authority to access the content server as requested in the request. Otherwise, the message is forwarded towards the content server with an indication that the intermediate device authenticated the upstream device.

In accordance with an aspect of the invention, the intermediate device may lack authority to authenticate upstream devices for messages directed to the content server. If so, the intermediate device discards the message and may place information associated with the message in a log file.

In accordance with another aspect of the invention, the content server may receive the message and determine whether the sender has authority to access the content server.

In accordance with another aspect of the invention, when the intermediate device is authorized to make decisions as to which senders may access the content server, the message may be modified to indicate that the intermediate device is making the request. The message may then be forwarded towards the content server. When the content server receives the message, it may determine whether the intermediate device has authority to access the content server as requested in the request.

In accordance with another aspect of the invention, the upstream device may be the sender. That is, the intermediate device may authenticate the sender of a message rather than a device that forwarded the message towards the content server.

In accordance with another aspect of the invention, various encryption algorithms may be employed to authenticate a device.

In accordance with another aspect of the invention, an intermediate device may have authority to authentic upstream devices for messages that are bound for the content server while not having authority to determine which senders have authority to access the content server as requested in the request. In accordance with another aspect of the invention, an intermediate device may have authority to authenticate an upstream device and authority to determine which sender have authority to access the content server.

In one aspect of the invention, only the content server determines which senders have authority to access it.

In another aspect of the invention, a downstream device authenticates the intermediate device. The downstream device may determine whether the intermediate device had authority to authenticate an upstream device. The downstream device may also provide an indication with the message that indicates that the downstream device authenticated the intermediate device. The downstream device may determine whether the sender has authority to cause the request to be performed on the content server.

In another aspect of the invention, an apparatus and system perform actions similar to those described above.

Aspects of the invention may be embodied in software and/or hardware and on a computer-readable medium and/or in a modulated data signal.

These and various other features as well as advantages, which characterize the present invention, will be apparent from a reading of the following detailed description and a review of the associated drawings.

DETAILED DESCRIPTION

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined by the appended claims.

In the following description, first an illustrative operating environment in which the invention may be practiced is disclosed. Then, an illustrative arrangement and interaction of elements within an operating environment is described. Then, a specific example is provided that illustrates one way in which components practicing the invention may operate. Finally, exemplary methods employed by the elements to access one or more content servers are described.

Illustrative Operating Environment

Figure 1:
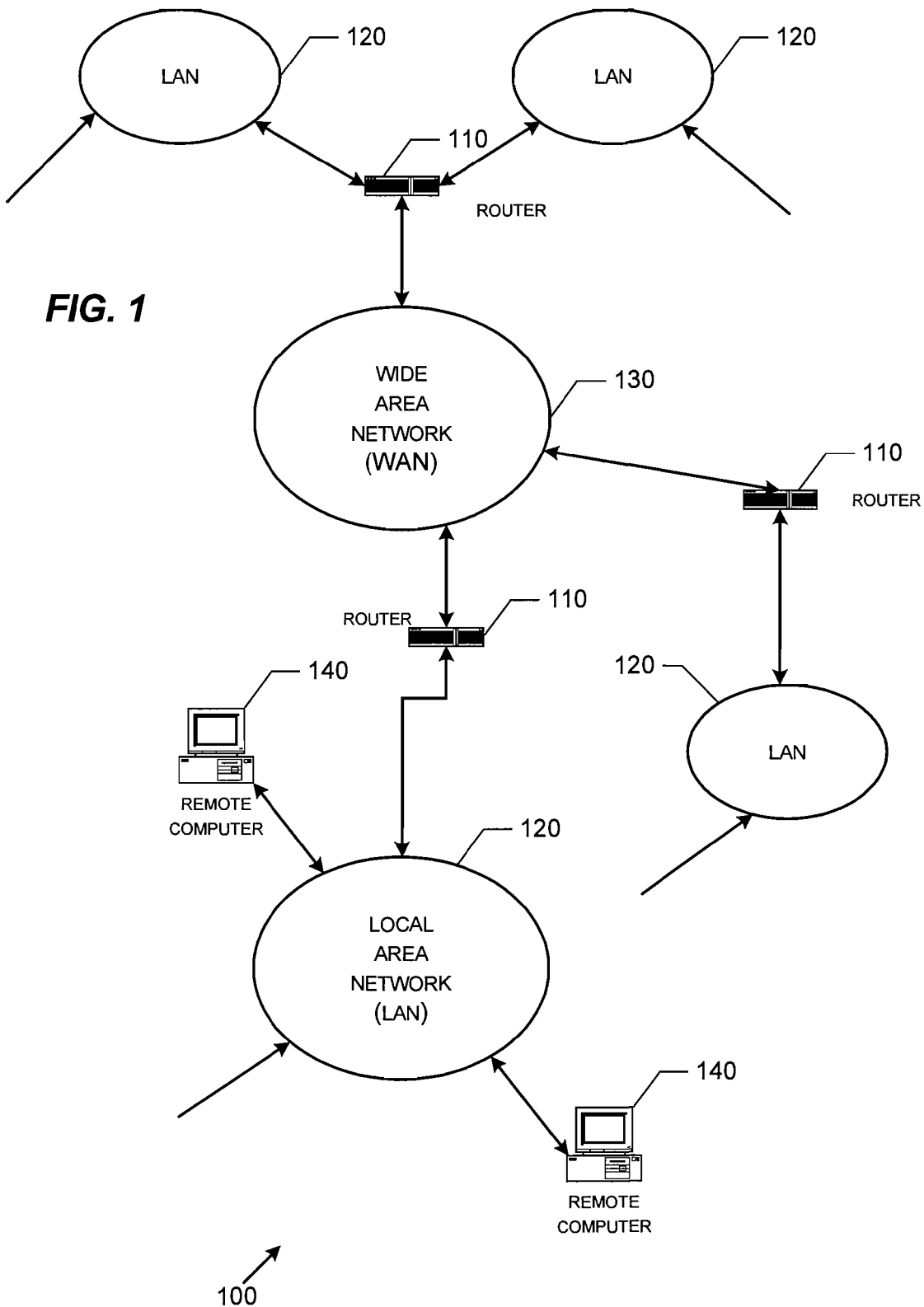
FIGS. 1-3 show components of an exemplary environment in which the invention may be practiced.
Figure 2:
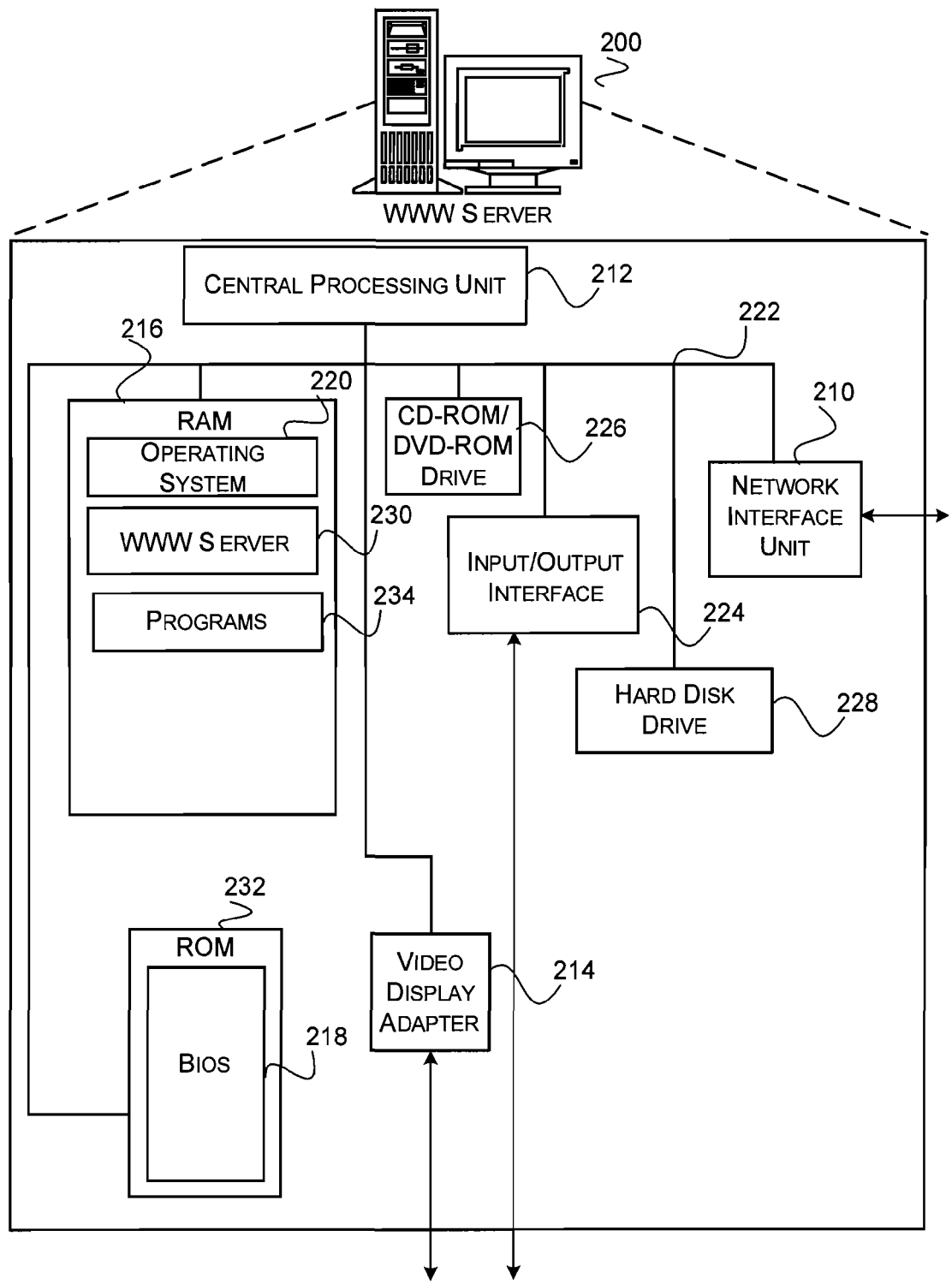
Figure 3:
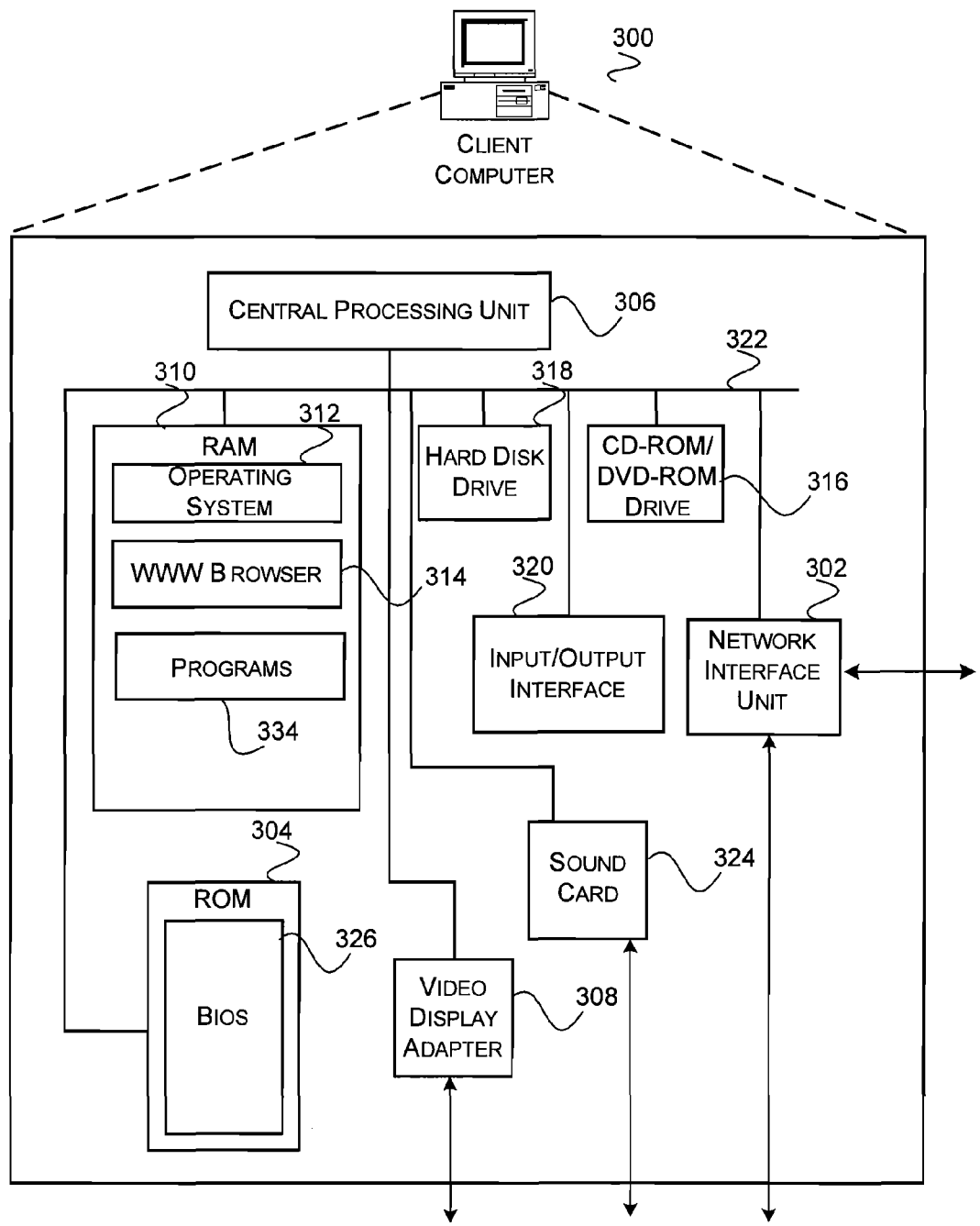

FIGS. 1-3 show components of an exemplary environment in which the invention may be practiced. Not all the components may be required to practice the invention, and variations in the arrangement and type of the components may be made without departing from the spirit or scope of the invention.

FIG. 1 shows a plurality of local area networks ("LANs") 120 and wide area network ("WAN") 130 interconnected by routers 110. Routers 110 are intermediary devices on a communications network that expedite message delivery. On a single network linking many computers through a mesh of possible connections, a router receives transmitted messages and forwards them to their correct destinations over available routes. On an interconnected set of LANs—including those based on differing architectures and protocols—, a router acts as a link between LANs, enabling messages to be sent from one to another. Communication links within LANs typically include twisted pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links known to those skilled in the art. Furthermore, computers, such as remote computer 140, and other related electronic devices can be remotely connected to either LANs 120 or WAN 130 via a modem and temporary telephone link. The number of WANs, LANs, and routers in FIG. 1 may be increased or decreased arbitrarily without departing from the spirit or scope of this invention.

As such, it will be appreciated that the Internet itself may be formed from a vast number of such interconnected networks, computers, and routers. Generally, the term "Internet" refers to the worldwide collection of networks, gateways, routers, and computers that use the Transmission Control Protocol/Internet Protocol ("TCP/IP") suite of protocols to communicate with one another. At the heart of the Internet is a backbone of high-speed data communication lines between major nodes or host computers, including thousands of commercial, government, educational, and other computer systems, that route data and messages. An embodiment of the invention may be practiced over the Internet without departing from the spirit or scope of the invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

The Internet has recently seen explosive growth by virtue of its ability to link computers located throughout the world. As the Internet has grown, so has the WWW. Generally, the WWW is the total set of interlinked hypertext documents residing on HTTP (hypertext transport protocol) servers around the world. Documents on the WWW, called pages or Web pages, are typically written in HTML (Hypertext Markup Language) or some other markup language, identified by URLs (Uniform Resource Locators) that specify the particular machine and pathname by which a file can be accessed, and transmitted from server to end user using HTTP. Codes, called tags, embedded in an HTML document associate particular words and images in the document with URLs so that a user can access another file, which may literally be halfway around the world, at the press of a key or the click of a mouse. These files may contain text (in a variety of fonts and styles), graphics images, movie files, media clips, and sounds as well as Java applets, ActiveX controls, or other embedded software programs that execute when the user activates them. A user visiting a Web page also may be able to download files from an FTP site and send messages to other users via email by using links on the Web page.

A server providing a WWW site, as the server described in more detail in conjunction with FIG. 2 may, is a computer connected to the Internet having storage facilities for storing hypertext documents for a WWW site and running administrative software for handling requests for the stored hypertext documents. A hypertext document normally includes a number of hyperlinks, i.e., highlighted portions of text which link the document to another hypertext document possibly stored at a WWW site elsewhere on the Internet. Each hyperlink is associated with a URL that provides the location of the linked document on a server connected to the Internet and describes the document. Thus, whenever a hypertext document is retrieved from any WWW server, the document is considered to be retrieved from the WWW. As is known to those skilled in the art, a WWW server may also include facilities for storing and transmitting application programs, such as application programs written in the JAVA programming language from Sun Microsystems, for execution on a remote computer. Likewise, a WWW server may also include facilities for executing scripts and other application programs on the WWW server itself.

A user may retrieve hypertext documents from the WWW via a WWW browser application program located on a wired or wireless device. A WWW browser, such as Netscape's NAVIGATOR® or Microsoft's INTERNET EXPLORER®, is a software application program for providing a graphical user interface to the WWW. Upon request from the user via the WWW browser, the WWW browser accesses and retrieves the desired hypertext document from the appropriate WWW server using the URL for the document and HTTP. HTTP is a higher-level protocol than TCP/IP and is designed specifically for the requirements of the WWW. HTTP is used to carry requests from a browser to a Web server and to transport pages from Web servers back to the requesting browser or client. The WWW browser may also retrieve application programs from the WWW server, such as JAVA applets, for execution on a client computer.

FIG. 2 shows an exemplary server that may operate to provide a WWW site, among other things. When providing a WWW site, server 200 transmits WWW pages to the WWW browser application program executing on requesting devices to carry out this process. For instance, server 200 may transmit pages and forms for receiving information about a user, such as address, telephone number, billing information, credit card number, etc. Moreover, server 200 may transmit WWW pages to a requesting device that allow a consumer to participate in a WWW site. The transactions may take place over the Internet, WAN/LAN 100, or some other communications network known to those skilled in the art.

Those of ordinary skill in the art will appreciate that the server 200 may include many more components than those shown in FIG. 2. However, the components shown are sufficient to disclose an illustrative environment for practicing the present invention. As shown in FIG. 2, server 200 is connected to WAN/LAN 100, or other communications network, via network interface unit 210. Those of ordinary skill in the art will appreciate that network interface unit 210 includes the necessary circuitry for connecting server 200 to WAN/LAN 100, and is constructed for use with various communication protocols including the TCP/IP protocol. Typically, network interface unit 210 is a card contained within server 200.

Server 200 also includes processing unit 212, video display adapter 214, and a mass memory, all connected via bus 222. The mass memory generally includes random access memory ("RAM") 216, read-only memory ("ROM") 232, and one or more permanent mass storage devices, such as hard disk drive 228, a tape drive (not shown), optical drive 226, such as a CD-ROM/DVD-ROM drive, and/or a floppy disk drive (not shown). The mass memory stores operating system 220 for controlling the operation of server 200. It will be appreciated that this component may comprise a general purpose server operating system as is known to those of ordinary skill in the art, such as UNIX, LINUX™, or Microsoft WINDOWS NT®. Basic input/output system ("BIOS") 218 is also provided for controlling the low-level operation of server 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may also store program code and data for providing a WWW site. More specifically, the mass memory may store applications including WWW server application program 230, and programs 234. WWW server application program 230 includes computer executable instructions which, when executed by server 200, generate WWW browser displays, including performing the logic described above. Server 200 may include a JAVA virtual machine, an SMTP handler application for transmitting and receiving email, an HTTP handler application for receiving and handing HTTP requests, JAVA applets for transmission to a WWW browser executing on a client computer, and an HTTPS handler application for handling secure connections. The HTTPS handler application may be used for communication with an external security application to send and receive sensitive information, such as credit card information, in a secure fashion.

Server 200 also comprises input/output interface 224 for communicating with external devices, such as a mouse, keyboard, scanner, or other input devices not shown in FIG. 2. Likewise, server 200 may further comprise additional mass storage facilities such as optical drive 226 and hard disk drive 228. Hard disk drive 228 is utilized by server 200 to store, among other things, application programs, databases, and program data used by WWW server application program 230. For example, customer databases, product databases, image databases, and relational databases may be stored.

Server 200 may be implemented as a blade server. A blade is a card inserted into a hardware chassis. A blade may include, for example, one or more processors, volatile and non-volatile memory, interfaces suitable for transferring information to and from the blade, and other components known to those skilled in the art. For example, a blade may include a specialized interface for transferring information to a backplane and other interfaces, such as a USB port, serial port, RF interface, IR interface, and IDE controller for transferring information to other devices.

FIG. 3 depicts several components of client computer 300. Those of ordinary skill in the art will appreciate that client computer 300 may include many more components than those shown in FIG. 3. However, it is not necessary that those generally-conventional components be shown in order to disclose an illustrative embodiment for practicing the present invention. As shown in FIG. 3, client computer 300 includes network interface unit 302 for connecting to a LAN or WAN, or for connecting remotely to a LAN or WAN. Those of ordinary skill in the art will appreciate that network interface unit 302 includes the necessary circuitry for such a connection, and is also constructed for use with various communication protocols including the TCP/IP protocol, the particular network configuration of the LAN or WAN it is connecting to, and a particular type of coupling medium. Network interface unit 302 may also be capable of connecting to the Internet through a point-to-point protocol ("PPP") connection or a serial line Internet protocol ("SLIP") connection as known to those skilled in the art.

Client computer 300 also includes BIOS 326, processing unit 306, video display adapter 308, and memory. The memory generally includes RAM 310, ROM 304, and a permanent mass storage device, such as a disk drive. The memory stores operating system 312 and programs 334 for controlling the operation of client computer 300. The memory also includes WWW browser 314, such as Netscape's NAVIGATOR® or Microsoft's INTERNET EXPLORER® browsers, for accessing the WWW. It will be appreciated that these components may be stored on a computer-readable medium and loaded into memory of client computer 300 using a drive mechanism associated with the computer-readable medium, such as a floppy disk drive (not shown), optical drive 316, such as a CD-ROM/DVD-ROM drive, and/or hard disk drive 318. Input/output interface 320 may also be provided for receiving input from a mouse, keyboard, or other input device. The memory, network interface unit 302, video display adapter 308, and input/output interface 320 are all connected to processing unit 306 via bus 322. Other peripherals may also be connected to processing unit 306 in a similar manner.

As will be recognized from the discussion below, aspects of the invention may be embodied on server 200, on client computer 300, or on some combination thereof. For example, programming steps may be contained in programs 334 and/or programs 234.

Illustrative Arrangement and Interaction of Elements

Figure 4:
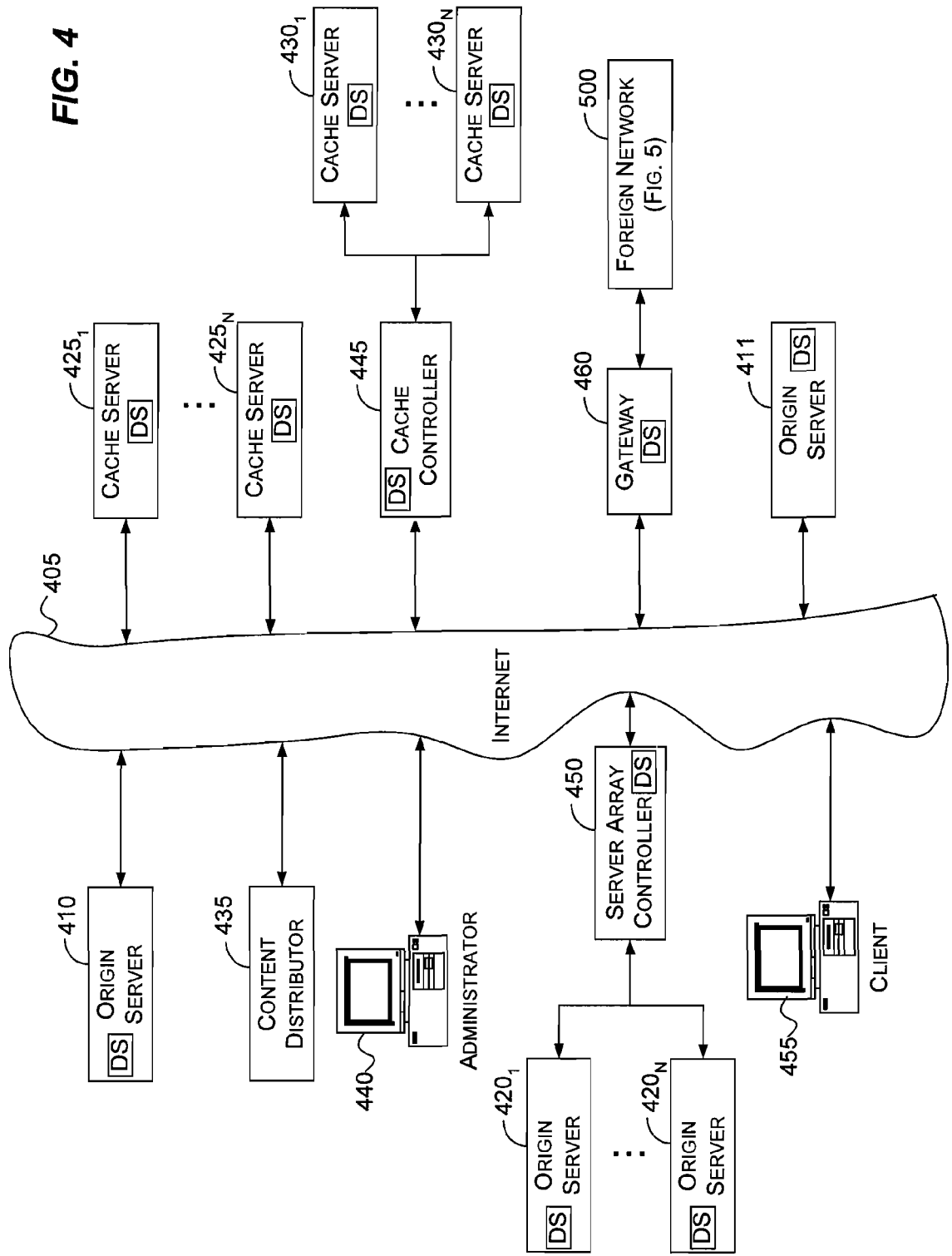
FIG. 4 illustrates an exemplary environment in which the invention operates in which content servers, administrator workstations, client computers, and content distributors are coupled through a wide area network/local area network.

FIG. 4 illustrates an exemplary environment in which the invention operates in which content servers, administrator workstations, client computers, and content distributors are coupled through a wide area network/local area network, according to one embodiment of the invention. The environment includes Internet 405 which is an example of a WAN/LAN, such as WAN/LAN 100 described in conjunction with FIG. 1. In addition, the environment includes origin servers 410-411 and 420$_{1-N}$, cache servers 425$_{1-N}$ and 430$_{1-N}$, content distributor 435, administrator computer 440, cache controller 445, server array controller 450, client computer 455, and gateway 460 each of which are coupled to Internet 405.

Content servers include any device capable of sending content to a requesting device, such as client computer 455. Two such types of content servers are a cache server, such as cache server 425$_1$, and an origin server, such as origin server 410. Generally, origin servers are servers which store original (as compared to cached) content. The content stored may be used to generate other content. For example, an origin server may include a database, i.e., original content, having entries about the status of orders. A customer may query the origin server to determine the status of an order placed by the customer. In response to the customer's query, a Web page may be generated that, in addition to the relevant order status, includes advertisements, notices, and/or other information that may be useful to the customer. To conserve storage space and compute resources, such a page is typically generated on request by a program executing on the origin server.

Information about products, such as a product brochure published into a Web page, on the other hand, may be statically stored and not require additional generation. That is, the published Web page showing the product brochure may have no other elements that need to be generated. This is what is generally referred to as a static Web page. Such pages may be created by a Web page developer and then distributed to content servers.

In contrast to origin servers, cache servers cache content and send it to requestors upon request. Generally, cache servers do not generate any additional content other than the content they cache (although doing so would not be outside the spirit or scope of this invention). The content may be a copy of content on other servers such as an origin server, a content publishing system (such as content distributor 435), or another cache. By caching frequently requested content, a cache server may greatly decrease the time between a request and a response to the request (known as response time). Typically, a client, such as client computer 455, may be unaware that the content server responding is a cache server rather than an origin server.

Origin servers, such as origin servers 410-411 and 420$_{1-N}$, may be coupled more directly to the Internet or they may be coupled to the Internet through a server array controller, such as server array controller 450. Server array controller 450 may cause origin servers 420$_{1-N}$ to appear to requesters as a single origin server. It does this by sending a message to one of origin servers 420$_{1-N}$ in response to a message sent to it. It may select an origin server to send the message to based on many metrics including load balancing metrics. It may perform network address translation (NAT) and/or other translations, such as port address translation (PAT), to maintain the appearance of being a single origin server. Each origin server in FIG. 4 could be replaced with a server array controller controlling an array of origin servers without departing from the spirit or scope of the invention.

Likewise, each cache server, such as one of cache servers 425$_{1-N}$ and 430$_{1-N}$, may be coupled more directly to the Internet or may be coupled to the Internet through a cache controller, such as cache controller 445. Cache controller 445 may cause cache servers 430$_{1-N}$ to appear to requesters as a single unified cache. Similar to a server array controller, it does this by sending a message to one of cache servers 430$_{1-N}$ in response to a message sent to it. It may select a cache server to send a message to based on many metrics including load balancing metrics. It may perform network address translation (NAT) and/or other translations, such as port address translation (PAT), to maintain the appearance of being a single cache server. Each cache server in FIG. 4 could be replaced with a cache controller controlling an array of cache servers without departing from the spirit or scope of the invention. It will be recognized that a cache controller may simply be a server array controller configured to provide access to cache servers.

Cache servers may be arranged in arrays, such as cache servers 425$_{1-N}$ and 430$_{1-N}$. A device connected to Internet 405, such as a domain name system (DNS) server (not shown), may receive domain name requests from a client or a local domain name system (LDNS) server. The device may direct the client to a cache server or an origin server by returning an IP address associated with the cache or origin server. The device may direct requests depending on network traffic, network topology, capacity of servers, content requested, and a host of other load balancing metrics. The cache servers of cache servers 425$_{1-N}$ may be located in one geographical location or may be spread to many different locations. Cache servers 425$_{1-N}$ may be coupled to Internet 405 through firewalls or other packet-filtering systems for security and/or other reasons.

Content distributor 435 is a content publishing system. It may provide an automated way for distributing versions of content. For example, it may link to source servers upon which programmers code HTML, executable, and/or image files. Automatically, or upon command, it may gather new or updated content from the source servers. It may store the new or updated content using versioning. Then, it may deliver the new or updated content to content servers. It may coordinate bringing origin servers offline and online and expiring versions of content Administrator computer 440 is an electronic device used to access and control content on content servers. Administrator computer 440 may be used to prepopulate content, expire content, pin certain content into memory, set quotas, and otherwise manipulate cache servers. Administrator computer 440 may also be used to take origin servers offline or bring them online. It may also be used to update content on the origin servers. An exemplary electronic device that may perform the services of administrator computer 440 is client computer 300 of FIG. 3, configured with appropriate software and hardware.

Client computer 455 requests content from content servers. An application that may be used to request content is a WWW browser application as described in detail in conjunction with FIG. 1.

Administrator computer 440 and client computer 455 may be implemented using any devices capable of executing instructions and connecting with Internet 405. Such devices may include devices that typically connect using a wired communications medium such as personal computers, multiprocessor systems, microprocessor-based or programmable consumer electronics, network PCs, and the like. Such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. In addition, administrator computer 440 and client computer 455 may also include any device that is capable of connecting using a wired or wireless communication medium such as PDAs, POCKET PCs, wearable computers, and other devices mentioned above that are equipped to use a wired and/or wireless communications medium. An exemplary client that may connect with Internet 405 is client computer 300 of FIG. 3.

Gateway 460 relays messages between foreign network 500 and Internet 405. Such messages may be used to control or access content servers on foreign network 500. Gateway 460 may be a special purpose gateway constructed specially to pass such update messages, or it may be a gateway that passes many types of messages, including update messages.

Figure 5:
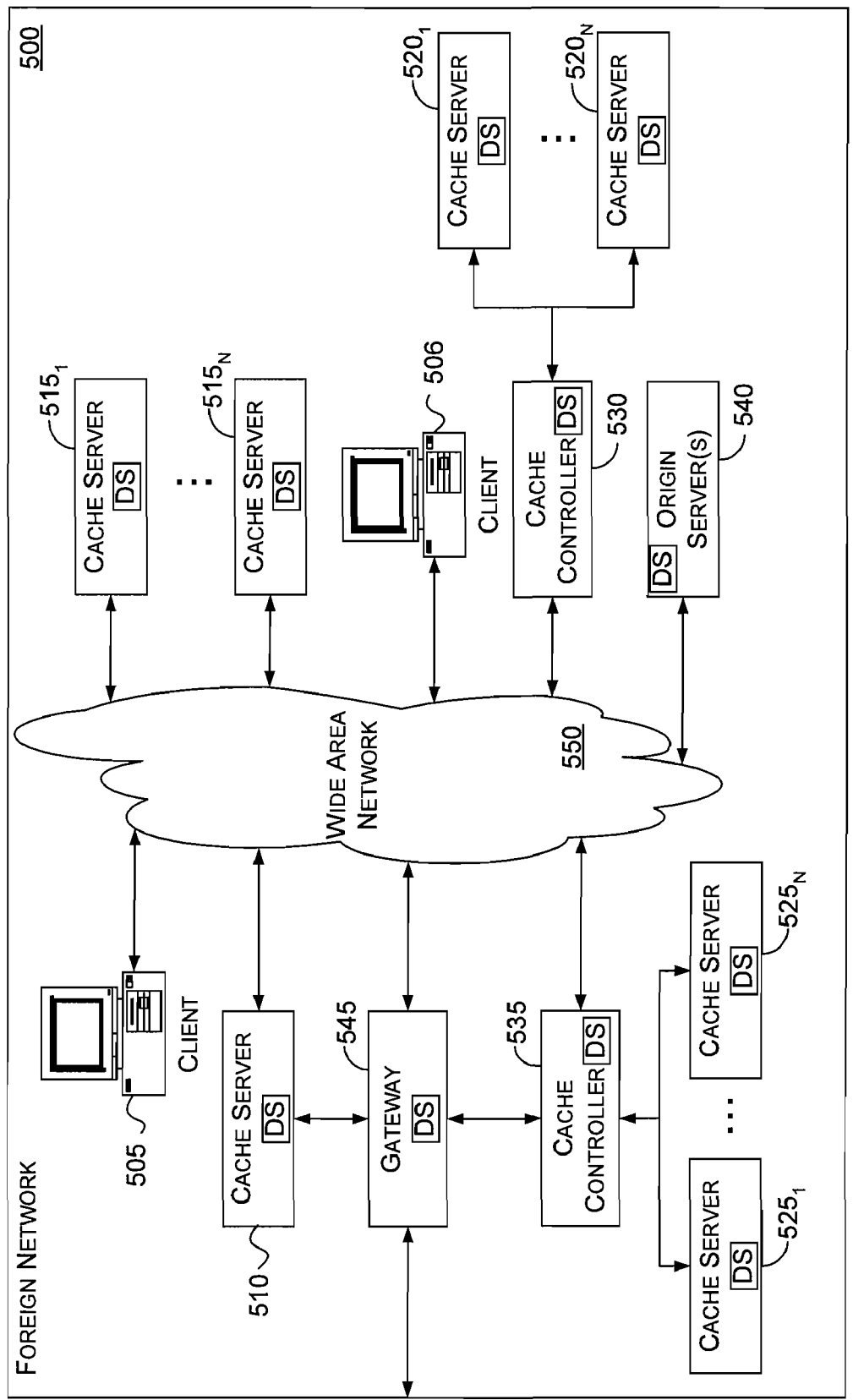
FIG. 5 shows a system on a foreign network that may cache and deliver content.

Foreign network 500 is described in more detail in conjunction with FIG. 5. Briefly, foreign network 500 may be any network that can be coupled to Internet 405 through a gateway such as gateway 460.

Several of the components shown in FIG. 4 have a component (or subcomponent) associated with them labeled "DS" which stands for data store. A data store typically includes information regarding a trust relationship between devices. For example, a first device may have a trust relationship with second device such that the first device trusts (and will process) any message sent by the second device. For example, a server managed by a server array controller may act upon any message sent by the server array controller.

A server array controller or cache controller (hereinafter sometimes referred to as "traffic manager") may be implemented using one or more personal computers, POCKET PCs, blades, components of a blade, wearable computers, processors, multiprocessor systems, microprocessor-based or programmable consumer electronics, network PCs, cell phones, smart phones, pagers, walkie talkies, radio frequency (RF) devices, infrared (IR) devices, CBs, integrated systems or devices combining one or more of the preceding devices, and the like. For example, a traffic manager may be implemented as a single blade, as multiple blades, as a server that includes a blade and other components, or as a component of a blade. Components implementing a traffic manager may be implemented solely in hardware or in hardware and software. For example, such devices may include some application specific integrated circuits (ASICs) coupled to one or more microprocessors. The ASICs may be used to provide a high speed switch fabric while the microprocessors may perform higher layer processing of packets. An exemplary device that could be used as a traffic manager is server 200 of FIG. 2, configured with appropriate software. A traffic manager may have multiple network interface units and each network interface unit may interface with one or more networks.

A data store may also include information that may be used in determining whether a sender has authority to cause a requested action to occur. Sender may refer to the original sender and/or to a network device that is sending or forwarding a message in response to a message sent to it. For example, a data store used by a cache server, such as cache server $430_1$ may indicate that the cache server will process any request send from cache controller 445. Alternatively, a data store used by a cache server may include data that indicates whether an original sender has rights to cause the requested action to be performed. A data store may include data that indicates that certain forwarding devices are authorized to perform some activities. For example, a data store may indicate that a forwarding device may authenticate an upstream device that is sending or forwarding a message to the content server.

The term "original sender" refers to the sender who initiated a message. It may refer to an entity other than an electronic device. For example, although content distributor 435 may, in a network sense, initiated a message that eventually arrives at cache server $520_1$, it may do so on behalf of a particular customer or entity. For example, a customer may have logged onto content distributor 435 and instructed content distributor 435 to update content on all content servers assigned or available to the customer. Alternatively, content distributor 435 may act automatically on behalf of the customer in a periodic update of content on content servers assigned or available to the customer.

A data store may be implemented using relational, hierarchical, flat file, object-oriented, or any other database technology. The database may be distributed or centralized. That is, each server may include its own complete or portion of a database or it may request data from a centralized database. A data store may also be implemented using data structures contained in a computer-readable medium, such as RAM or ROM, associated with the device. Examples of how data stores may be used will be described in conjunction with FIG. 5-7.

A data store on one component may include similar or different data from the data in a data store on another component. For example, a data store on cache server $430_1$ may include one set of values while a data store on cache server $430_N$ may include another set of values. Based on the data stores on these two cache servers, for example, a sender may be able to cause actions to be performed on cache server $430_1$ while not being able to cause similar actions to be performed on cache server $430_N$, even though both cache servers are accessed through cache controller 445.

Data stores on any device are optional. Not having a data store may mean that the device simply forwards a message towards its intended recipient. For example, gateway 460 may not use a data store to determine whether to forward messages to foreign network 500. Rather, gateway 460 may simply forward a message addressed to a device within foreign network 500 without authenticating the sender or checking to see if the sender has permission to cause an end device to which the message is to be forwarded to perform the action.

A message sent through the system above may include a request for a content server to perform an action. Such an action may relate to activities including storing or retrieving content from the content server, changing, adding, or removing a permission associated with a sender, and/or configuring the content server. Configuring the content server may include such activities as pre-populating content so that it is available before being requested, pinning certain content so that it is not removed to make room for other content, assigning quotas of resources available to certain vendors or customers accessing such vendors' Web sites, removing content from a content server, causing a content server to go offline or online, causing a content server to backup its files periodically, and/or a host of other configuration activities.

FIG. 5 shows a system on a foreign network that may cache and deliver content, according to one embodiment of the invention. The system includes client computers 505 and 506, cache servers 510, $515_{1-N}$, $520_{1-N}$, $525_{1-N}$, cache controllers 530 and 535, origin server(s) 540, gateway 545, and wide area network 550.

The network shown in FIG. 5 might be used when a company provides a dial in service. When a user dials into the service using, for example, client computer 506, the user is connected to a private network. As long as the user accesses content within the network, traffic from and to the user stays within the network shown. When a user tries to access content on another network, such as Internet 405, a determination may be made as to whether that content already exists within the private network on an origin server, such as origin server(s) 540, or on a cache server. If it is determined that the content does exist within the network, the client is directed to the appropriate content server; otherwise, the client's request is forwarded to an external network, such as Internet 405, to fulfill the request.

Client computers 505 and 506 are coupled to wide area network 550 of foreign network 500. They may request content that is supplied by a content server within foreign network 500 or a content server foreign to foreign network 500. Physically, client computers 505 and 506 are similar to client computer 455 of FIG. 4.

Gateway 545 provides a link between foreign network 500 and Internet 405. Gateway 545 may or may not be limited to the networking arts definition of gateway. For example, gateway 545 may include information regarding content servers located in foreign network 500 and how messages may be sent to them, such as a router might. It may include programs accessed by a content publishing server or an administrative computer to update or manipulate content servers within foreign network 500. For example, it may receive an expiration message sent from content distributor 435 or administrator computer 440 of FIG. 4. It may then use its knowledge of cache servers on foreign network 500 to propagate the expiration message to cache servers in foreign network 500.

Additionally, gateway 545 may be used when a requestor from another network requests content from foreign network 500. Upon receipt of a request, gateway 545 may determine a suitable cache server to service the request.

Similarly, gateway 545 may be used when a requestor within foreign network 500 requests content from a server on Internet 405. Gateway 545 may intercept such a request, determine that a server within foreign network 500 has the requested content, and refer the request to the determined server.

In another embodiment of the invention, gateway 545 does not make a determination as to a suitable cache server to service a request. In this embodiment, gateway 545 relays messages to devices within foreign network 500, much like a typical gateway or router would in the traditional functioning of such devices.

Cache server 510 is coupled to gateway 545 and WAN 550 and performs the functions of a cache server, such as cache server $425_1$ of FIG. 4. It may be closely coupled to gateway 545 as shown in FIG. 5, so that it may more rapidly retrieve and send content in response to a request.

Cache servers on foreign network 500 may be arranged in arrays, such as cache servers $515_{1-N}$. A device connected to wide area network 550, such as a domain name system (DNS) server (not shown), may receive domain name requests from a client or a local domain name system (LDNS) server. The device may direct the client to a cache server or an origin server by returning an IP address associated with the cache or origin server. The device may direct requests depending on network traffic, network topology, capacity of servers, content requested, and a host of other load balancing metrics. Cache servers $515_{1-N}$ may be located in one geographical location or may be spread to many different locations. Cache servers may be coupled to wide area network 550 through firewalls or other packet-filtering systems for security and/or other reasons.

Cache controllers 530 and 535 make cache servers $520_{1-N}$ and $525_{1-N}$, respectively, each appear to requestors as a single unified cache, similar to how cache controller 445 makes cache servers $430_{1-N}$ appear to requestors as a single unified cache. Cache controller 535 may have requests for content that were previously directed at gateway 545 directed to it, while cache controller 530 may have requests for content directed to a server on wide area network 550 directed to it.

Origin server(s) 540 may or may not exist on foreign network 500. When they do exist, they operate similar to origin servers 410-411 as described in more detail in conjunction with FIG. 4.

Wide area network 550 couples various components of FIG. 5 together. It may be implemented in wired and/or wireless technologies. In another embodiment of the invention, wide area network 550 is replaced with a local area network or a wide area network and one or more local area networks. A network exemplary of a wide area network 550 is WAN/LAN 100 of FIG. 1.

Illustrative Examples of Interaction of Components in a System in Authenticating and Authorizing Requestors Requesting Actions of Content Servers In one embodiment of the invention, assume that a content distributor for a customer is directed to expire cache on a content server. For example, assume that content distributor 435 of FIG. 4 is directed to expire cache on cache server $520_1$ of FIG. 5. In this embodiment of the invention, one set of actions that may occur follows. Content distributor 435 might send a cache expiration message addressed to cache server $520_1$. This message would travel through Internet 405 and be relayed to gateway 460. If gateway 460 authenticates senders (rather than just sending messages through), gateway 460 would then authenticate the sender of the message, namely content distributor 435.

Authentication refers to determining that a sender is who "it" says it is. This may be accomplished through a variety of mechanisms including digital signatures, public key/private key authentication using Rivest-Shamir-Adleman (RSA) or Pretty Good Privacy (PGP), or other authentication algorithms. For example, with a digital signature, a sender can insert into or attach to a message data that is encrypted using a key that is known to the sender only. In public key/private key encryption algorithms, the key that is known to the sender only is typically called the sender's private key. When the data arrives at an authenticator, the authenticator can then use the sender's public key to decrypt the data.

The data itself may include information that authenticates the sender. For example, the data may include a time stamp generated by the sender. Upon decryption of the data, the receiver may compare its time with the time stamp included in the data. If the times are too far apart, the receiver may determine that the sender is not authentic.

As another example for authenticating a sender, a sender could create a message and use a digest function to create a digest of the message. Then, the sender could encrypt the digest using the sender's private key to create a digital signature. The sender could then send this digital signature to a receiver. Upon receipt, the receiver could decrypt the digest using the sender's public key. The receiver could also decrypt the message and then create a digest of the message using the same digest function. If the decrypted digest and the created digest did not match, the receiver could determine that the sender was not authentic or that the message had been altered.

It will be recognized that many different algorithms for authenticating a sender could be used without departing from the spirit or scope of the invention.

If gateway 460 determines that the sender cannot or will not authenticate itself, gateway 460 may drop the connection with the sender and refuse to allow the sender to send a message to cache server 520₁ through gateway 460. A sender might not be able to authenticate itself if, for example, it is an imposter or if it has lost its private key.

If gateway 460 determines that the sender is who it says it is, gateway 460 may then retrieve from gateway 460's data source what trust relationship gateway 460 has with the end destination device, i.e., cache server 520₁. For example, gateway 460 may have a trust relationship with cache server 520₁ wherein cache server 520₁ will perform any request sent from gateway 460. Cache server 520₁ may trust gateway 460 to make access control decisions for cache server 520₁. That is, cache server 520₁ may trust gateway 460 to determine whether cache server 520₁ should perform an action contained in a request sent through gateway 460. Alternatively, cache server 520₁ may have a trust relationship with gateway 460 such that cache server 520₁ has authorized gateway 460 to authenticate an upstream device.

The term upstream device refers to any device the message passes through to get to the device receiving a message. An upstream device might be the original sender of the message. When a downstream device has a trust relationship with an upstream device such that the upstream device is authorized to authenticate a device further upstream, the upstream device may authenticate the further upstream device, but the upstream device may or may not make an access control decision for the downstream device. The upstream device may make an access control decision for the downstream device provided that the downstream device has a trust relationship with the upstream device that allows the upstream device to perform this decision. Otherwise, the upstream device may not make an access control decision for the downstream device.

For this example, assume that gateway 460 has a trust relationship with cache server 520₁ such that gateway 460 may authenticate further upstream devices that send messages directed to cache server 520₁, but that gateway 460 cannot perform an access control decision for cache server 520₁. When gateway 460 receives a message from an upstream device, such as content distributor 435, gateway 460 may authenticate that the message comes from content distributor 435, but may not perform an access control decision for cache server 435.

Gateway 545 may have the same trust relationship with cache server 520₁ as gateway 460 does. If so, when gateway 545 receives the message from gateway 460, gateway 545 authenticates gateway 460 and sends an indication of the authentication with the message to devices further downstream.

When the message arrives at cache controller 530, it authenticates gateway 545. For this example, assume that cache controller 530 is authorized to make access control decisions for cache server 520₁. After cache controller 530 authenticates gateway 545, cache controller 530 may then determine if content distributor 435 has permission to expire cache on cache server 520₁. Cache controller 530 may consult its data store to make this determination. If cache controller 530 determines that content distributor 435 has permission to expire cache on cache server 520₁, cache controller 530 may then send a message to cache server 520₁ instructing cache server 520₁ to expire the content. Cache controller 530 may indicate that cache controller 530 is instructing cache server 520₁ to expire the cache. That is, cache controller 530 may remove any indications that the message came from any other upstream device besides cache controller 530. As far as cache server 520₁ is concerned, the message came directly from cache controller 530.

A device that requests that an action be performed is referred to as "the authorized user." That is, "the authorized user" refers to an entity requesting that its access rights should be used in determining whether the action may be performed. The authorized user may be the original sender, i.e., the device or user who initiated the request, or it may be a downstream device. A downstream device may determine that an upstream device, such as content distributor 435, has permission to perform a requested action on a content server, such as cache server 520₁. After making this determination, the downstream device may send a request to a device further downstream indicating that the downstream device is requesting that the action be performed. As discussed above, the downstream device may remove any indications that the message came from any other upstream device. As far as devices further downstream are concerned, the message may appear to come directly from the downstream device.

When cache server 520₁ receives the message, it first authenticates cache controller 530. Because, in this example, cache server 520₁ trusts cache controller 530 to make access control decisions for cache server 520₁, after authenticating cache controller 530, cache server 520₁ may then determine if cache controller 530 has permission to cause the requested action to be performed. If cache controller 530 has permission to cause the requested action to be performed, cache server 520₁ performs the action. Cache server 520₁ may have a permissions database that allows cache controller to cause any action to be performed on cache server 520₁.

If cache server 520₁ did not trust cache controller 530 to make access control decisions for cache server 520₁, after authenticating cache controller 530, cache server 520₁ would then determine whether the authorized user had authority to cause the requested action to be performed.

Any device through which a message passes (including the end device) may also examine the authority of upstream devices in the actions they have performed. For example, cache controller 530 may determine whether gateway 545 had authority to authenticate gateway 460 and whether gateway 460 had authority to authenticate content distributor 435. If the device determines that an upstream device did not have authority to perform an action, the device may discard the message and/or log information regarding the message. Alternatively, a downstream device may trust the device from which it received the message to vouch for a device further upstream. That is, it may trust that each upstream device authenticated a previous sender all the way to the original sender. Thus, the fact that cache controller 530 is sending a message to cache server 520₁ may establish to cache server 520₁ the authenticity of the original sender.

Authentication may occur at every or at fewer than every device through which a message passes in route to its final destination. For example, a gateway may simply forward a packet to another device. It may perform no authentication or authorization at all. For example, content distributor 435 may open a communications channel with cache controller 530 through, for example, a TCP connection. In this embodiment, gateways 460 and 545 and routers, gateways, and other devices (not shown) in Internet 405 and wide area network 550 may simply forward packets between content distributor 435 and cache controller 530. In this case, a device receiving a message may authenticate any upstream sender of the message (not just the most immediate sender or forwarder of the message). For example, cache controller 530 may authenticate that content distributor 435 has opened the TCP connection and is sending the packets that comprise a message. Cache controller 530 may do this by retrieving permissions from its data store.

Each device in the stream of devices through which a message travels to get to its destination can set up a trust relationship with the upstream device and the downstream device. The trust relationship may be, for example, that the device can authenticate an upstream device or that the device can make an access control decision. If the device cannot make an access control decision, this decision may be deferred to a device further downstream.

For example, in FIGS. 4-5, the destination server, e.g. cache server $520_1$, can have a trust relationship with one or more of its upstream devices, e.g. cache controller 530, such that anything cache controller 530 requests the destination server does. This may be done using an access control list. The access control list indicates that cache controller 530 has authority to cause anything to happen on the destination server. When the destination server does this, it is making an assumption that one of two things can occur: (1) either all messages are going to originate from cache controller 530 and cache controller 530 knows what is going on; or (2) if cache controller 530 is acting as an intermediary or a proxy, cache controller 530 has an access control list that indicates that an upstream requestor, such as content distributor 435, has authority to perform a particular action, such as expire content on the destination server. So, if content distributor 435 sends a message of expire, cache controller 530 checks a database such as an access control list to see if content distributor 435 can expire the message on the destination device. If content distributor 435 has authority to expire the message on the destination device according to cache controller 530's access control list, cache controller 530 may sends a message to the destination device indicating that cache controller 530 is asking the destination device to expire content. This could be used, for example, when parties with conflicting interests are not sharing the destination server.

Another trust relationship could also occur. The destination device may have an access control list that indicates that a requestor, such as content distributor 435, can expire content on the destination device and that an intermediate device, such as cache controller 530, can authenticate an upstream device. When cache controller 530 receives a message from an upstream device, cache controller 530 consults its access list and authenticates the upstream device. Then cache controller 530 forwards the message to the destination device. With the message, cache controller 530 can indicate that it is cache controller 530 and that it has authenticated the upstream device. When the message is received at the destination device, the destination device could check two pieces of information. It would check to see if cache controller 530 can authenticate requesters. It would also check on the permissions of the requestor, e.g. content distributor 435, to see if the requestor has the right to expire content on the destination device. This could be used, for example, when parties with conflicting interests are sharing resources on the destination server.

Flowcharts

Figure 6:
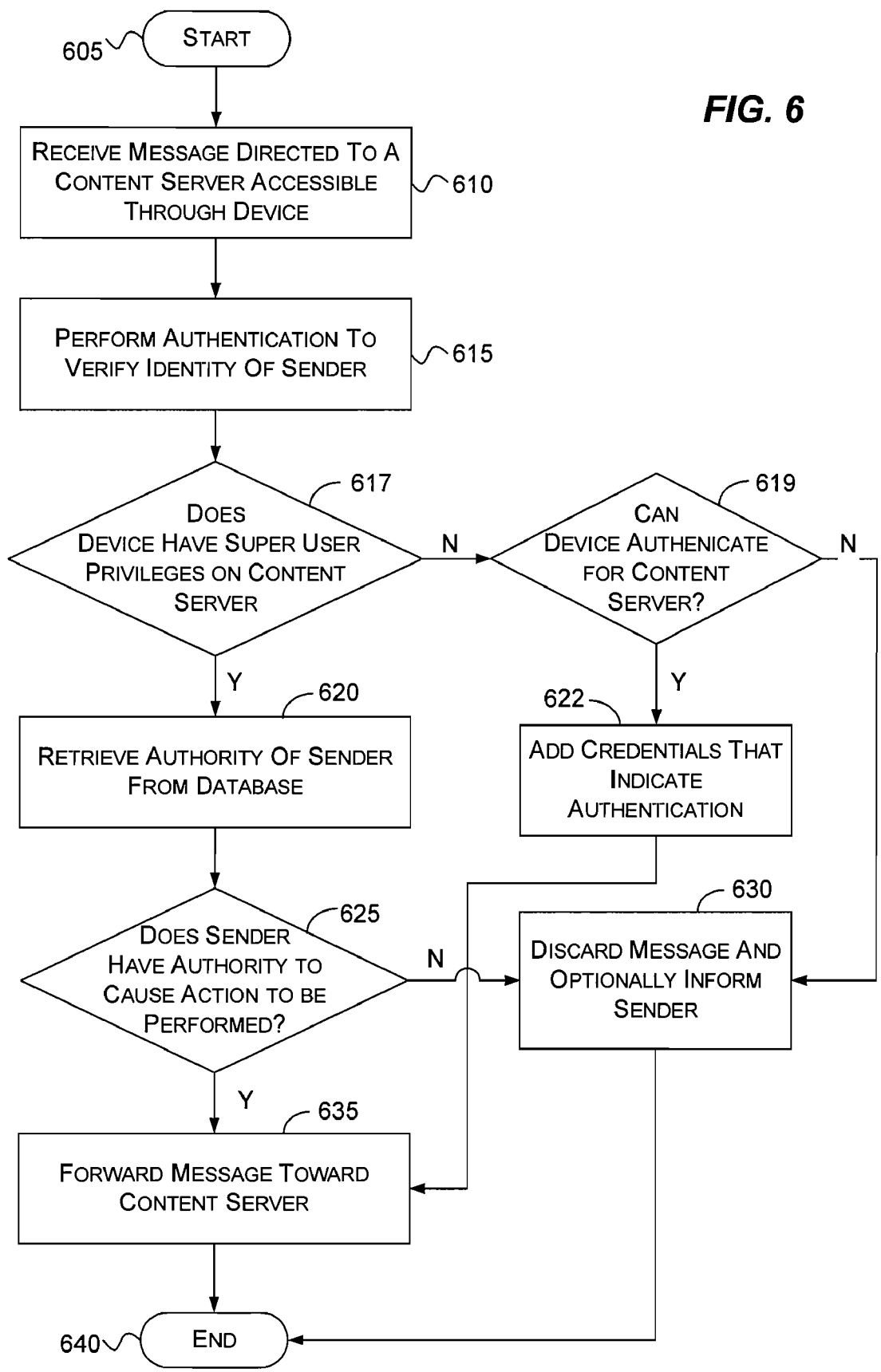
FIG. 6 is a flowchart that shows a process of authenticating and retrieving the authority or permissions of a sender.

FIG. 6 is a flowchart that shows a process of authenticating and retrieving the authority or permissions of a sender, according to one embodiment of the invention. The process begins at block 605 when a network device is ready to receive a message. After block 605, processing continues at block 610.

At block 610, a message is received that is directed to a content server accessible through the network device. For example, referring to FIG. 4, gateway 460 receives a message directed to cache server $520_1$. For purposes of this example, assume that the message comes from content distributor 435. Assume the message is a request to flush content on cache server $520_1$. After block 610, processing continues at block 615.

At block 615, the sender is authenticated. If the sender cannot authenticate itself, the receiving network device may discard the message or disconnect from the sender and refuse to act on the message received. For example, referring to FIG. 4, gateway 460 asks content distributor 435 to authenticate itself. In response, content distributor 435 sends a digital signature which gateway 460 determines is authentic. After block 615, processing continues at block 617.

At block 617, a determination is made as to whether the device is a super user on the content server. Typically, a super user on the content server can make access control decisions for the content server. For example, a super user on the content server typically has authority to determine what entities can access the content server and/or what each entity can cause to happen on the content server. If the device does not have super user privileges on the content server, processing continues at block 619; otherwise, processing continues at block 620. For example, referring to FIG. 4, assume that gateway 460 does not have super user privileges on cache server $520_1$, but that cache controller 530 does.

At block 619, a determination is made as to whether the device can authenticate an upstream sender of the message for the content server. That is, does the device have permission to authenticate upstream devices trying to send a message to the content server. If the device can authenticate for the content server, processing continues at block 622; otherwise, processing continues at block 630.

At block 620, the authority of the sender is retrieved from a database accessible to the network device. Block 620 is reached when the device can make access control decisions for the content server. That is, there may be a trust relationship between the content server and the device such that if a device sends a message requesting an action to be performed by the content server, that the content server will perform that action. In this case, the content server may perform the action without determining if the original sender had authority to cause the action to be performed.

In fact, information about the original sender may be removed from the message before it is sent to the content server. To the content server, the message may appear to have originated from the device. Whatever authority the device has to cause an action to be performed on the content server may attach to the message. For example, referring to FIG. 4, cache controller 530 retrieves from a database authority records associated with content distributor 435. After block 620, processing continues at block 625.

At block 622, the credentials are added that indicate that the device has authenticated an upstream sender. The identity of the upstream sender may also be added. The device may modify the message (or data passed with the message) to indicate that the device has authenticated an upstream sender. In addition, or alternatively, the device may log into a downstream device and indicate that it has authenticated an upstream sender. The downstream device is typically the next device in the chain of devices through which the message passes to arrive at the content server. The other device may be the destination device for the message. The device does not indicate that it is requesting that the request contained in the message be performed; rather, the device is indicating to the next device that it authenticated an upstream sender of the message. For example, referring to FIG. 4, gateway 460 may authenticate content distributor 435 and indicate to the next device that it has authenticated content distributor 435 by adding this information to the message or data passed with the message.

The next device that receives the message may then authenticate gateway 460. It may also determine if gateway 460 has authority to authenticate other devices sending messages to cache server 520$_1$. If the next device determines that gateway 460 is not authentic or does not have authority to authenticate other devices sending messages, it may simply discard the message as done in step 630. Each time the message passes through a device, the device may check through each of the credentials contained in or passed with the message to determine if each device had authority to do what it did, e.g. authenticate another device, etc. Alternatively, a downstream device may determine that it trusts an upstream device to make access control decisions for the downstream device. For example, a server behind a server array controller may trust the server array controller to determine whether an original sender had authority to cause the requested action to occur on the server. After block 622, processing continues at block 635.

At block 625, a determination is made as to whether the sender has authority to cause the action to be performed on the destination device. If the sender has authority, processing branches to block 635; otherwise, processing branches to block 630. Before continuing at block 635, the device receiving the message may strip the message of credentials associated with upstream devices and may indicate that the device is requesting that the action be performed as discussed previously. For example, referring to FIG. 4, cache controller 530 uses the authority records retrieved to determine whether content distributor 435 has permission to flush content on cache server 520$_1$. Because cache controller 530 makes access control decisions for cache server 520$_1$ (an assumption in this example), cache controller 530 may remove credentials associated with upstream devices. It may then prepare to send a message to cache server 520$_1$ that indicates that cache controller 530 is the user whom cache server 520$_1$ should treat as requesting that the action be performed.

At block 630, the message may be discarded and the sender may be informed of its lack of authority. A copy of the message together with sender information may be stored in a log for security tracking purposes. For example, referring to FIG. 4, gateway 460 determines that it does not have authority to authenticate devices for messages directed to cache server 520$_1$. Or, for example, cache controller 530 determines that content distributor 435 does not have permission to flush content on cache server 520$_1$. After block 630, processing continues at block 640.

At block 635, the message is forwarded toward a content server. For example, referring to FIG. 4, gateway 460 forwards the message towards its intended recipient, i.e. cache server 520$_1$, by forwarding the message to gateway 545 of FIG. 5. Or, for example, cache controller 530 forwards the message to cache server 520$_1$ indicating that cache server 520$_1$ should treat the message as if cache controller 530 requested that the action be performed. After block 635, processing continues at block 640.

At block 640, the process ends. At this point, a message directed to a content server has been received by a network device. Authentication has been performed to authenticate the identity of the sender. If the receiving device can make an access control decision for the destination device, the authority (or permissions) of the sender has been retrieved. If the sender did not have permission to cause the action to be performed on the destination device, the message was discarded (and/or logged) and an error message may be sent to the sender. If the sender did have permission, the message was forwarded toward the content server (and may have had the previous credentials removed). If the device does not have authority to make an access control decision for the destination device, the device determined whether it can authenticate the upstream device for the content server. If the device could not authenticate an upstream device, the message was discarded (and/or logged). If the device could authenticate an upstream device, the device added credentials that it forwarded with the message to indicate that it had authenticated an upstream device from which the message was received. The process above may be repeated for each message received by a network device and for each device in a stream of devices through which the message passes to arrive at the destination device.

Figure 7:
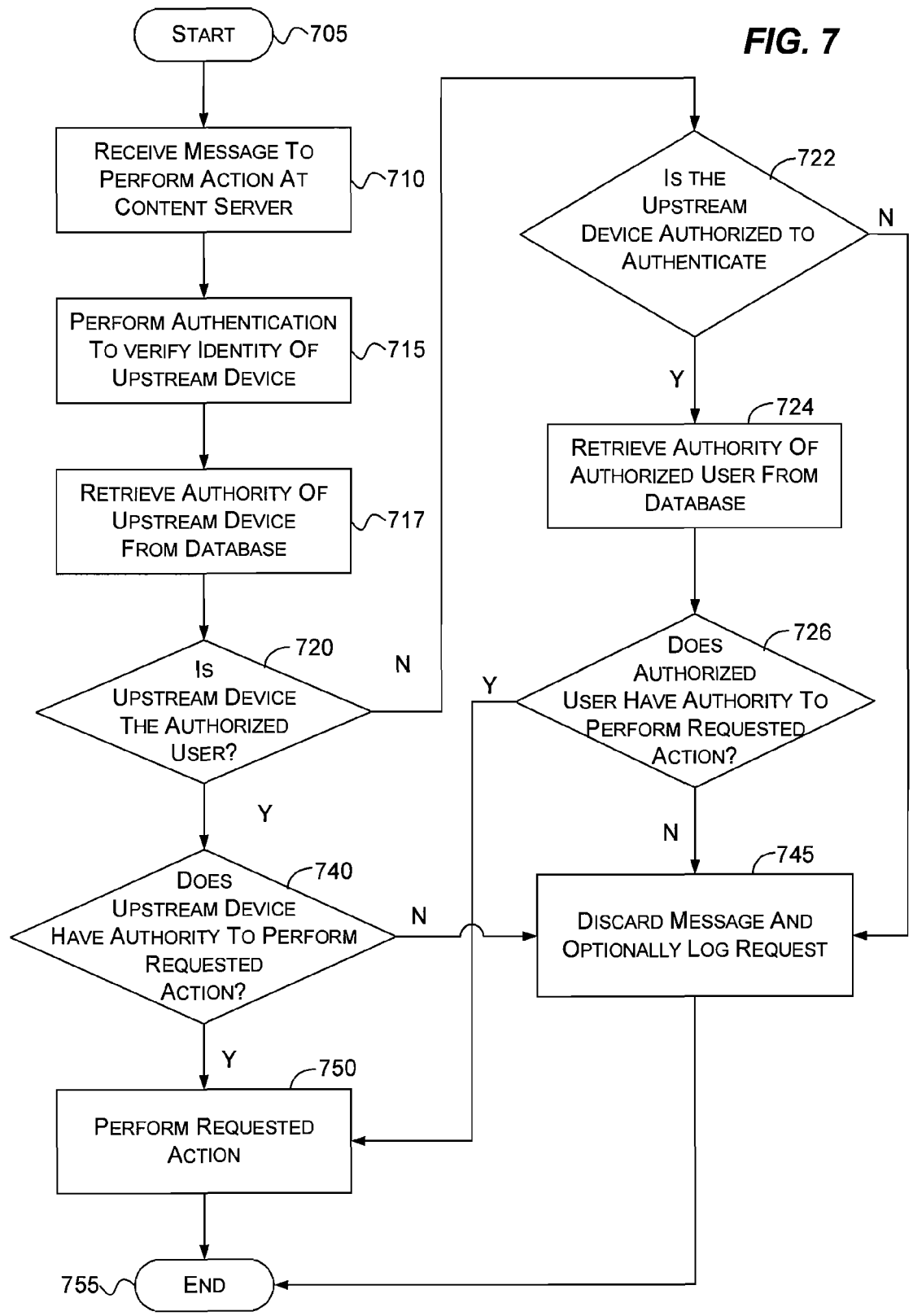
FIG. 7 is a flowchart that shows a process of authenticating a sender and determining the sender's access rights to a content server.

FIG. 7 is a flowchart that shows a process of authenticating a sender and determining the sender's access rights to a content server, according to one embodiment of the invention. The process begins at block 705 when a content server is ready to receive a message. After block 705, processing continues at block 710.

At block 710, a message is received at a content server. The message may be used to control the content server and/or to request content from the content server. For example, referring to FIG. 5, cache server 520$_1$ receives a message from cache controller 530. After block 710, processing continues at block 715.

At block 715, authentication is performed to verify the identity of the device sending the message. This device may be the authorized user or some intermediate device. Both of these devices are referred to as an "upstream device" in this flowchart. For example, referring to FIG. 5, cache server 520$_1$ authenticates that it received a message from cache controller 530. If the upstream device cannot or will not authenticate itself, the content server may discard the message and/or drop a connection with the upstream device. After block 715, processing continues at block 717. 735 is likely the next logical step—the devices authZ is going to have to be checked with he's performing the action or just attempting to authenticate the upstream sender.

At block 717, the authority of the upstream device is retrieved from a database. For example, referring to FIGS. 4 and 5, cache server 520$_1$ retrieves the authority of cache controller 530. After block 717, processing continues at block 720.

At block 720, a determination is made as to whether the upstream device is the authorized user. That is, has the upstream device indicated that it is (or should be treated as) the device requesting that the action be performed, i.e. as the authorized user, or is the upstream sender indicating that it has authenticated an upstream sender and passed the authorized user's request to the content server. In the former case, the upstream device is considered to be the authorized user. In the latter case, the upstream device is not considered to be the authorized user. If the upstream device is the authorized user, processing branches to block 735; otherwise, processing branches to block 722.

At block 722, a determination is made as to whether the upstream device is authorized to authenticate other devices further upstream. If the upstream device is authorized to authenticate devices further upstream, processing continues at block 724; otherwise, processing continues at block 745. It should be understood that by authenticating a device further upstream, the upstream device may indirectly authenticate the original sender or some other authorized user (because the device further upstream may indicate to the upstream device that the device further upstream authenticated the original sender or some other authorized user).

At block 724, the authority of the authorized user is retrieved from a database. For example, referring to FIG. 5, cache server $520_1$ retrieves permissions associated with the customer (not shown) who initiated a content update on content distributor 435. For example, referring to FIGS. 4 and 5, cache server $520_1$ retrieves the authority of content distributor 435.

At block 726, a determination is made as to whether the authorized user has authority to cause the requested action to be performed. If so, processing continues at block 750; otherwise, processing continues at block 745. For example, referring to FIGS. 4 and 5, cache server $520_1$ determines whether content distributor 435 has authority to cause content on cache server $520_1$ to be flushed.

At block 740, a determination is made as to whether the upstream device has authority to cause the requested action to be performed. If the upstream device does, processing continues at block 750; otherwise, processing continues at block 745. For example, referring to FIGS. 4 and 5, cache server $520_1$ determines that cache controller 530 has super user privileges on cache server $520_1$. Thus, cache controller 530 may have authority to cause cache server $520_1$ to perform any action of which cache server $520_1$ is capable.

At block 745, the message is discarded and/or stored in a log. In addition, the original sender may be informed of its lack of authority. For example, referring to FIG. 4, content distributor 435 may be informed that it lacks authority to flush content on cache server $520_1$. After block 745, processing continues at block 755.

At block 750, the action is performed. For example, referring to FIGS. 4 and 5, cache server $520_1$ performs the requested action of flushing a content entry that was originally sent from content distributor 435. After block 750, processing continues at block 755.

At block 755, processing ends. At this point a message has been received and an upstream sender of the message has been authenticated. If the upstream device was not the authorized user, a check was performed to determine if the upstream device was authorized to authenticate the original sender. If not, the message was discarded and may have been logged. Otherwise, an authority of the authorized user was retrieved from a database. If the authorized user had authority to cause the action to be performed, the action was performed. Otherwise, the message was discarded and may have been logged. If the upstream sender was the authorized user, the authority of the upstream device was retrieved. If the upstream device had authority to cause the requested action to be performed, the requested action was performed; otherwise, the message was discarded and may have been logged. This process may be repeated for each request received by a content server.

The various embodiments of the invention may be implemented as a sequence of computer implemented steps or program modules running on a computing system and/or as interconnected machine logic circuits or circuit modules within the computing system. The implementation is a matter of choice dependent on the performance requirements of the computing system implementing the invention. In light of this disclosure, it will be recognized by one skilled in the art that the functions and operation of the various embodiments disclosed may be implemented in software, in firmware, in special purpose digital logic, or any combination thereof without deviating from the spirit or scope of the present invention.

The above specification, examples and data provide a complete description of the manufacture and use of the composition of the invention. Since many embodiments of the invention can be made without departing from the spirit or scope of the invention, the invention resides in the claims hereinafter appended.

What is claimed as new and desired to be protected by Letters Patent of the United States is:

1. A method for distributing secure access to a content server over a network, comprising:
   receiving at an intermediate device a message from an upstream device, wherein the message includes a request from a sender for access to the content server;
   if the intermediate device authenticates the upstream device, forwarding the message towards the content server;
   if a downstream device of the upstream device determines that the intermediate device is authorized to authenticate the upstream device, enabling the sender of the message access to the content server;
   enabling the downstream device through which the message passes on its way to the content server to determine if the sender is authorized to access the content server; and
   sending, by the downstream device, the message to the content server with an indication that the downstream device authenticated the intermediate device.

2. The method of claim 1, further comprising if the intermediate device is unable to authenticate the upstream device, discarding the message.

3. The method of claim 1, further comprising:
   receiving the message at the content server; and
   enabling the content server to determine if the sender of the received message is authorized to access the content server.

4. The method of claim 1, further comprising:
   modifying the message to indicate that the request is provided to the downstream device as if requested by the intermediate device; and
   enabling the content server to determine if the intermediate device is authorized to access the content server as requested in the modified message.

5. The method of claim 1, wherein the authentication by the intermediate device employs at least one of a digital signature and a public key/private key encryption algorithm.

6. The method of claim 1, wherein the intermediate device is arranged to determine if the sender is authorized to access the content server.

7. A computer storage media that includes components for distributing secure access to a content server over a network, comprising:
   a first component that enables an intermediate device to receive a message from an upstream device, wherein the message includes a request from a sender for access to the content server;
   a second component that enables the intermediate device to forward the message towards the content server if the intermediate device authenticates the upstream device; and
   a third component that enables the sender of the message access to the content server if a downstream device of the upstream device determines that the intermediate device is authorized to authenticate the upstream device, wherein the downstream device through which the message passes on its way to the content server is arranged to determine if the sender is authorized to access the content server, and wherein the downstream device sends the message to the content server with an indication that the downstream device authenticated the intermediate device.

8. The computer storage media of claim 7, further comprising another component for discarding the message if the intermediate device is unable to authenticate the upstream device.

9. The computer storage media of claim 7, further comprising another component for enabling the content server to determine if the sender of the received message is authorized to access the content server.

10. The computer storage media of claim 7, further comprising another component that modifies the message to indicate that the request is provided to the downstream device as if requested by the intermediate device.

11. The computer storage media of claim 10, further comprising another component that enables the content server to determine if the intermediate device is authorized to access the content server as requested in the modified message.

12. The computer storage media of claim 7, wherein the authentication by the intermediate device employs at least one of a digital signature and a public key/private key encryption algorithm.

13. The computer storage media of claim 7, wherein the intermediate device is arranged to determine if the sender is authorized to access the content server.

14. An apparatus for distributing secure access to a content server over a network, comprising:
   an interface that receives a message from an upstream device, wherein the message includes a request from a sender for access to the content server; and
   circuitry coupled to the interface, the circuitry configured to perform actions, including:
      if the apparatus authenticates the upstream device, forwarding the message towards the content server;
      if a downstream device of the upstream device determines that the apparatus is authorized to authenticate the upstream device, enabling the sender of the message access to the content server; and
      enabling the downstream device to send the message to the content server with an indication that the downstream device authenticated the intermediate device.

15. The apparatus of claim 14, wherein the circuitry is arranged to perform further actions, comprising discarding the message if the intermediate device is unable to authenticate the upstream device.

16. The apparatus of claim 15, wherein the circuitry is arranged to perform further actions, comprising enabling the content server to determine if the sender of the received message is authorized to access the content server.

17. The apparatus of claim 14, wherein the circuitry is arranged to perform further actions, comprising modifying the message to indicate that the request is provided to the downstream device as if requested by the intermediate device.

18. The apparatus of claim 14, wherein the circuitry is arranged to perform further actions, comprising enabling the content server to determine if the intermediate device is authorized to access the content server as requested in the modified message.

19. The apparatus of claim 14, wherein the circuitry is arranged to perform further actions, comprising enabling authentication with at least one of a digital signature and a public key/private key encryption algorithm.

20. The apparatus of claim 14, wherein the circuitry is arranged to perform further actions, comprising determining if the sender is authorized to access the content server.

21. The apparatus of claim 14, wherein the circuitry is arranged to perform further actions, comprising enabling the downstream device through which the message passes on its way to the content server is arranged to determine if the sender is authorized to access the content server.

22. The apparatus of claim 14, wherein the circuitry is disposed on at least one blade.

23. A system for providing secure access to a content server over a network, comprising:
   an upstream device configured to send a message including a request from a sender to access a content server;
   an intermediate device configured to forward the message towards the content server if the intermediate device authenticates the upstream device; and
   a downstream device of the upstream device and through which the message passes on its way to the content server, the downstream device configured to:
      enable the sender of the message access to the content server if the downstream device determines that the intermediate device is authorized to authenticate the upstream device; and
      send the message to the content server with an indication that the downstream device authenticated the intermediate device.

24. The system of claim 23, wherein the sender is a content distributor that is configured to update content on a plurality of content servers that includes at least the content server.

* * * * *

UNITED STATES PATENT AND TRADEMARK OFFICE
CERTIFICATE OF CORRECTION

| | | |
|---|---|---|
| PATENT NO. | : 7,676,828 B1 | Page 1 of 2 |
| APPLICATION NO. | : 11/531662 | |
| DATED | : March 9, 2010 | |
| INVENTOR(S) | : Donald Joseph DeCaprio | |

It is certified that error appears in the above-identified patent and that said Letters Patent is hereby corrected as shown below:

On Title page, in field (57), in column 2, in "Abstract", line 2, delete "requesters" and insert -- requestors --, therefor.

On Sheet 2 of 7, in FIG. 2, below Reference Numeral 200, line 1, delete "S ERVER" and insert -- SERVER --, therefor.

On Sheet 2 of 7, in FIG. 2, Reference Numeral 230, line 1, delete "S ERVER" and insert -- SERVER --, therefor.

On Sheet 3 of 7, in FIG. 3, Reference Numeral 314, line 1, delete "B ROWSER" and insert -- BROWSER --, therefor.

On Sheet 6 of 7, in FIG. 6, Reference Numeral 619, line 2, delete "AUTHENICATE" and insert -- AUTHENTICATE --, therefor.

In column 1, line 47, delete "requesters" and insert -- requestors --, therefor.

In column 7, line 59, delete "requesters" and insert -- requestors --, therefor.

In column 8, line 7, delete "requesters" and insert -- requestors --, therefor.

In column 8, line 45, after "content" insert -- . --.

In column 10, line 25, delete "FIG." and insert -- FIGS. --, therefor.

In column 11, line 36, delete "requester" and insert -- requestor --, therefor.

In column 12, line 4, delete "requesters" and insert -- requestors --, therefor.

Signed and Sealed this
Fifteenth Day of February, 2011

David J. Kappos
*Director of the United States Patent and Trademark Office*

In column 15, line 52, delete "requesters." and insert -- requestors. --, therefor.

In column 18, line 38, delete "717.735" and insert -- 717. 735 --, therefor.